(12) United States Patent
Bourque et al.

(10) Patent No.: US 7,140,584 B2
(45) Date of Patent: Nov. 28, 2006

(54) SPEAKER SUPPORT BRACKET FOR A MONITOR

(76) Inventors: Raymond Bourque, 511 Tabor Ct., Safety Harbor, FL (US) 34695; John Ziegler, 4626 5th St. South, St. Petersburg, FL (US) 33705

( * ) Notice: Subject to any disclaimer, the term of this patent is extended or adjusted under 35 U.S.C. 154(b) by 0 days.

(21) Appl. No.: 10/931,762

(22) Filed: Sep. 1, 2004

(65) Prior Publication Data
US 2006/0043247 A1    Mar. 2, 2006

(51) Int. Cl.
*E04G 3/00*    (2006.01)

(52) U.S. Cl. .............. 248/274.1; 248/309.1; 248/918

(58) Field of Classification Search .......... 248/274.1, 248/918, 311.2, 442.2, 231.11, 225.11; 312/9.47, 312/9.48
See application file for complete search history.

(56) References Cited

U.S. PATENT DOCUMENTS

| | | | | |
|---|---|---|---|---|
| 4,869,565 A | * | 9/1989 | Bachman | 312/234 |
| 5,035,392 A | * | 7/1991 | Gross et al. | 248/442.2 |
| 5,082,235 A | * | 1/1992 | Crowther et al. | 248/231.41 |
| 5,125,612 A | * | 6/1992 | McNeal | 248/442.2 |
| 5,190,258 A | * | 3/1993 | Yu | 248/279.1 |
| 5,292,099 A | * | 3/1994 | Isham et al. | 248/442.2 |
| 5,383,642 A | * | 1/1995 | Strassberg | 248/442.2 |
| 5,947,434 A | * | 9/1999 | Kosmoski et al. | 248/298.1 |
| 6,100,942 A | * | 8/2000 | Hollenbaugh et al. | 348/836 |
| 6,290,200 B1 | * | 9/2001 | Ko | 348/442.2 |
| 6,311,946 B1 | * | 11/2001 | Hoffman | 248/682 |
| 6,721,434 B1 | * | 4/2004 | Polk et al. | 381/388 |

\* cited by examiner

*Primary Examiner*—Amy J. Sterling
(74) *Attorney, Agent, or Firm*—Yaté K. Cutliff, Attorney at Law

(57) ABSTRACT

A speaker support bracket for a monitor that includes an adjustable mounting bracket that can be positioned about the top of a monitor, with speaker platforms that allow the speakers to be seated adjacent the side of the monitor. The adjustable mounting bracket has a pair of interconnected vertical legs that are spaced apart. Each of the legs is parallel at least on side of the monitor. Each of the vertical legs has a speaker support platform with an adjustment arm.

9 Claims, 6 Drawing Sheets

SPEAKER SUPPORT BRACKET FOR A MONITOR

BACKGROUND OF THE INVENTION

1. Field of the Invention

The present invention relates to a speaker support bracket for a monitor and more particularly pertains to an adjustable bracket system for supporting the audio speakers of a computer about the computer monitor.

2. Description of the Related Art

The use of audio speaker supports for computers is known in the prior art. More specifically, speaker supports heretofore devised and utilized for the purpose of supporting speakers above the desk top and near the monitor are known to consist basically of familiar, expected and obvious structural configurations, notwithstanding the myriad of designs encompassed by the crowded prior art which have been developed for the fulfillment of countless objectives and requirements.

It is known that most audio speakers are placed adjacent the computer monitor on a table or other flat surface of the computer work station. This placement tends to clutter the work area, reduce the amount of useful work space and may impair the computer operator's efficiency. Moreover, access to the speakers may be hindered by other equipment. In many instances the speakers are normally placed on the same table that supports the monitor, they are usually located well below the level of the operator's ears and tend to produce a poor audio output. Sound quality may be further reduced because the speakers are often scattered about the work station and are not necessarily pointed toward the operator. Basically, even though speakers are needed and desired, the average individual places the speakers where ever it is convenient and out of the way of their work space.

By way of example, the prior art includes U.S. Design Pat. No. 366,478 to Daniels, et al. claims an ornamental design for a combined multimedia attachment and speakers for a computer monitor. The design of Daniels et al. shows a support structure that is positioned along the bottom of the monitor, with the support structure having built in speakers.

U.S. Pat. No. 5,125,612, to David R. McNeal is to a bracket that includes a pair of rings suspended from a bracket boom extending from the side of a computer monitor and worksheets are suspended from the rings to allow the computer operator to flip the worksheets over the bracket boom. U.S. Pat. No. 5,190,258, to Chung C. Yu, discloses an "Articulated Support Assembly" for a computer audio amplifier housing. The assembly includes a first arm which can be pivoted from a retracted position in the housing to an angularly-extended position from the housing and a second arm which can be pivoted from a retracted position in the first arm to an angularly-extended position therefrom. An adjustable speaker mount at the extending end of the second arm pivotally receives a computer speaker and allows the speaker to be rotated and tilted at various selected positions on the speaker mount. U.S. Pat. No. 5,639,060, to Sean K. Spoonts, et al, describes a "Mounting Bracket For Computer Speakers" for mounting an audio speaker to a computer, characterized by a mounting bracket having an upper section for engaging the upwardly-facing surface of a monitor. A generally vertical side section depends from the horizontal upper section for engaging a side surface of the monitor. A generally horizontal platform section extends outwardly from the side section for supporting an audio speaker thereon. The mounting bracket is secured typically by adhesive tape to the computer monitor. U.S. Pat. No. 5,666,263, to Kevin W. Mundt, et al, discloses "Attaching A Speaker To A Computer Component", in which a coupling of selected design is configured to detachably secure a speaker to a computer component, by gravity. The coupling is characterized by a pocket provided on the computer which removably receives a flange provided on the speaker, or vertically-aligned projecting elements on the computer which are removably inserted in respective receptacles on the speaker. The speaker is attached to the computer by inserting the flange or projecting elements into the pocket or receptacles, respectively, and lowering the speaker to a position at which the speaker is secured to the computer. A "Means For Attaching Accessories To Video Display Terminal" is detailed in U.S. Pat. No. 5,683,070, to Paul Seed. A channel is provided in the front and real edges ol the side and top segments of a rectangular frame which is fitted on the front face of the video display terminal. The computer accessory is fastened to a bracket provided with a pair of flanges which are inserted in the channels.

Further, U.S. Pat. No. 5,947,434 to Kosmoski et al. comprises an adjustable and universally fitting bracket for mounting loudspeakers outboard of virtually any sized or shaped video monitor, in combination with a loudspeaker housing adapted for adjustable angular engagement with the bracket. U.S. Pat. No. 5,810,314 to Raziano for a support bracket supportable on the upper surface of a television monitor or computer monitor which includes a pair of parallel support arms, the first ends of the arms supported on the forward edge of the monitor surface, and extending rearward to a second end. The arms would be held in spaced apart relation with a transverse support arm, secured to each principal support arms; further is included a pair of rear leg members, extending between the second end of the arms and having lower ends resting on the rear of the upper surface of the monitor; the rear leg members having the ability to be height adjustable so that when the lower ends of the leg members are resting on the rear of the monitor the principal support arms are in a horizontal position in order to support the VCR or other item in a horizontal position on the monitor.

Additional, example of devices that support audio speakers for the computer is U.S. Pat. No. 5,738,320, to Matos et al. is a shelf that attaches to the monitor of a personal computer and supports speakers, as well as other office related items, above a horizontal work surface. Specifically, the invention of Matos et al. relates to a support shelf which positively locks in a selected angularly adjusted position to horizontally support the speakers or other items from a tilted monitor.

U.S. Pat. No. 6,015,132, to Belle shows an adjustable, reusable device, and a method for its use, for securing computer accessories, such as audio speakers, in a suspended, out-of-the-way position against the upper side surfaces of computer monitors and computer central processing unit tower housings so as to free the work space around the base of monitors and tower housings for other uses.

U.S. Pat. No. 6,100,942, to Hollenbaugh et al. is a storage devices for materials associated with, and used with a desk-top computer system, and more particularly to a storage device and speaker holder which is adjustably mountable on a computer monitor. Lastly, U.S. Pat. No. 6,311,946, to Hoffman is a saddlebag support for supporting a pair of computer speakers on opposite sides of a computer monitor, above the monitor-supporting surface, wherein the saddlebag support is characterized by a flexible, generally Y-shaped, right speaker support having a pair of parallel monitor top engaging strips for resting on the top of the computer monitor and a similar, flexible, left speaker support having a pair of attachment strips for removable attachment to the respective monitor top engaging strips of the right speaker support.

Therefore, it can be appreciated that there exists a continuing need for a new and improved speaker support bracket for computer monitor which can be used to keep speakers from resting on the desk with a bracket system for supporting the audio speakers of a computer about the computer monitor. In this regard, the present invention substantially fulfills this need.

SUMMARY OF THE INVENTION

The present invention provides apparatus for forming a bracket system for supporting the audio speakers about any type of monitor.

After extensive study and testing of several device designs, the present inventor discovered that the present design proved to be most functional Accordingly, a primary of purpose of the speaker support bracket for monitors is to provide a bracket system for supporting the audio speakers of a computer about the computer monitor. As such, the general purpose of the present invention, will be described subsequently in greater detail.

To attain this, the present invention essentially comprises an adjustable mounting bracket which includes a right speaker platform and a left speaker platform. The right and left speaker platforms each having an interconnected vertical leg that is interconnected with the adjustable mounting bracket. Each of the vertical legs are spaced apart and parallel a respective side of a computer monitor.

Included is a right adjustment arm that is capable of fastening onto the right speaker platform and a left adjustment arm that is capable of fastening onto the left speaker platform. When the adjustable mounting bracket is positioned juxtapose the top of the computer monitor, the right and left speaker platforms will each support a speaker next to a right side and left side of the computer monitor. Further, the right and left speaker platforms will support a speaker the support surface of the computer monitor.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways, such as mounting speakers about a television. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is the object of the present invention to provide a new and improved speaker support bracket for any type of monitor which may be easily and efficiently manufactured and marketed.

Another object of the present invention to provide a new and improved speaker support bracket for a computer monitor which is of a durable and reliable construction.

A further object of the present invention is to provide a new and improved speaker support bracket for a monitor which is susceptible of a low cost of manufacture with regard to both materials and labor, and which accordingly is then susceptible of low prices of sale to the consuming public, thereby making such speaker support bracket for a computer monitor economically available to the buying public.

An even further object of the present invention is to provide a new and improved speaker support bracket for a computer monitor which provides in the apparatuses a means to support speakers about a television monitor, computer monitor or any other type of monitor having exterior speakers.

Still an even further object of the present invention is to provide a speaker support bracket for a computer monitor to keep the speakers off of the desk, to free up previously unusable desk space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
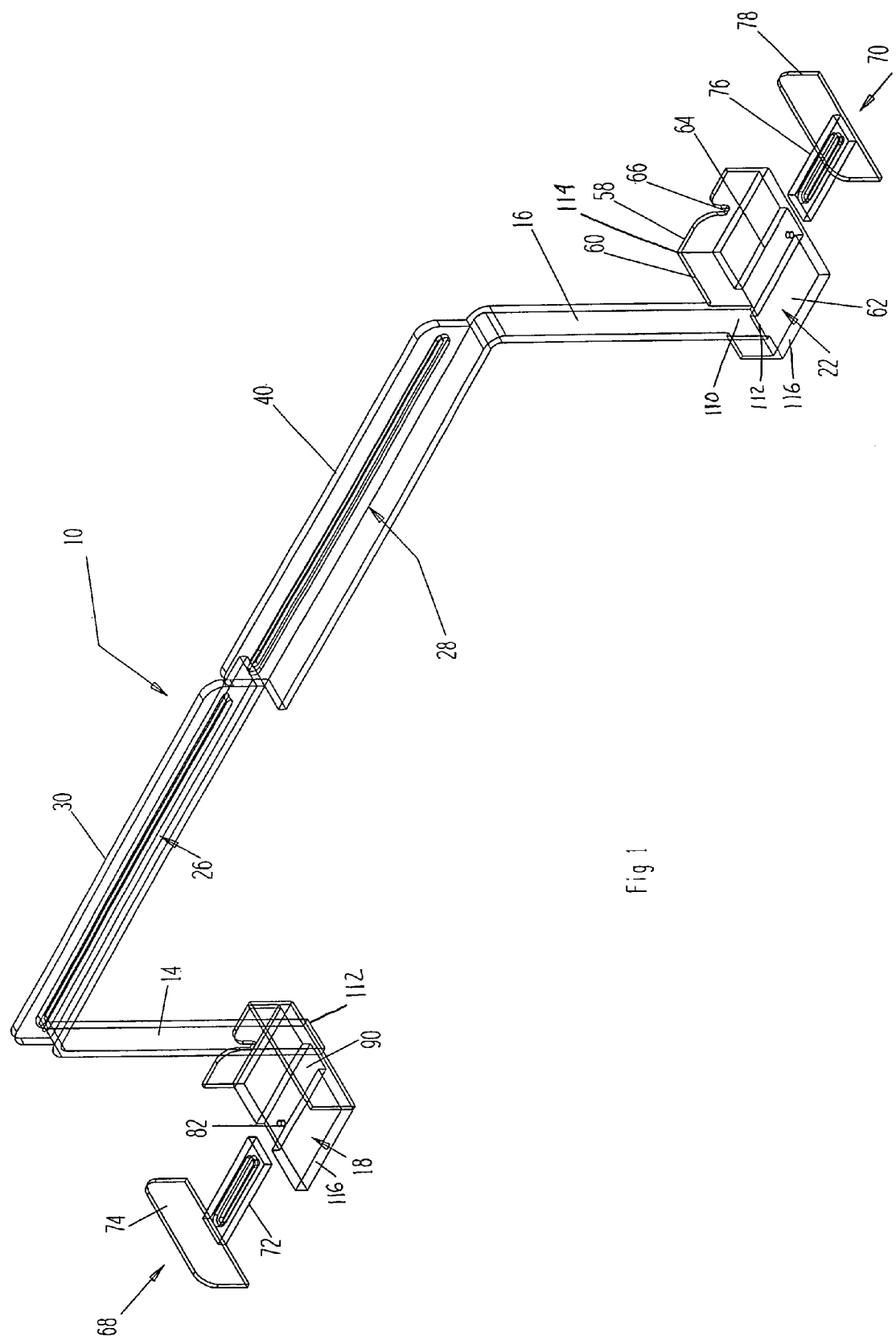
FIG. 1 is a perspective illustration of the preferred embodiment of the speaker support bracket for a computer monitor constructed in accordance with the principles of the present invention.

With reference now to the drawings, and in particular to FIGS. 1–6 thereof, a speaker support bracket 10 for a monitor embodying the principles and concepts of the present invention and generally designated by the reference numeral 10 will be described.

The present invention, the new and improved speaker support bracket for a monitor, is comprised of a plurality of components. Such components in their broadest context include a mounting bracket 12, a pair of vertical legs 14, 16, a right speaker platform 18 and a left speaker platform 22. Such components are individually configured and correlated with respect to each other so as to attain the desired objective.

More specifically, the present invention speaker support bracket for a computer monitor has the following basic components; a mounting bracket 12 with a pair of speaker platforms. Specifically, as in FIG. 1, there is a right speaker platform 22 and a left speaker platform 18. Each of the speaker platforms has a vertical leg extending upward therefrom and connecting with the mounting bracket. Each of the vertical legs is interconnected with the adjustable mounting bracket. Further, each of the vertical legs are spaced apart, with one vertical leg 14 parallel the right side of the computer monitor and the other vertical leg 16 parallel the left side of the computer monitor.

The mounting bracket has a first bracket arm 26 and a second bracket arm 28 that are fastened together in a way that allows the length of the mounting bracket to be increased or decreased when position about the monitor. The first bracket arm has a vertical leg 14 and speaker platform 18 integral thereto and sized to be positioned on the left side of the monitor. The second bracket arm has a vertical leg 16 and speaker platform 22 integral thereto and sized to be position on the right side of the monitor.

Figure 3:
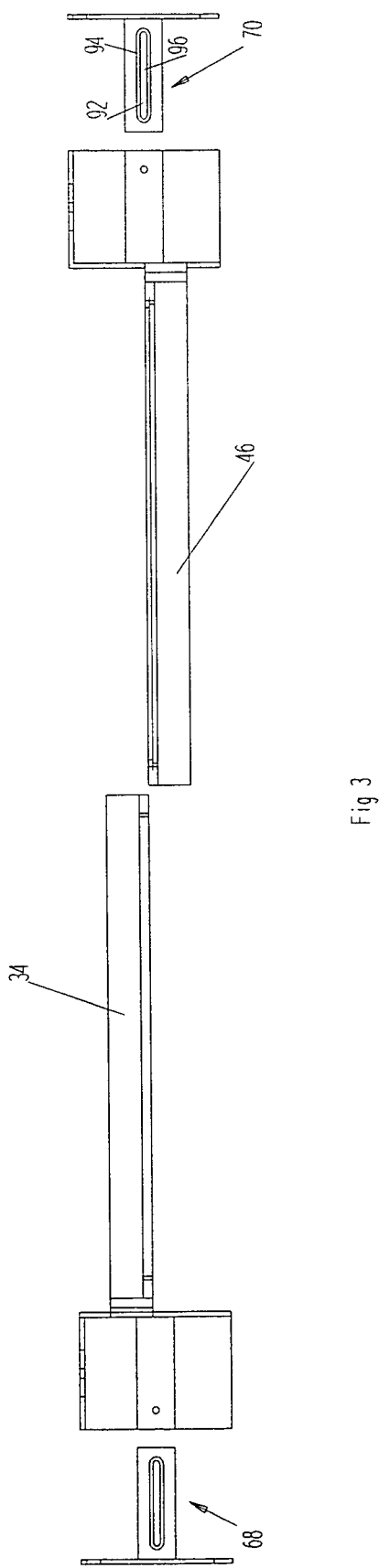
FIG. 3 a is top exploded view.

The first bracket arm 26 has a first horizontal upright 30 that is perpendicular thereto and extends from the end of the first bracket arm to the vertical leg. Basically the first horizontal upright extends the entire length of the first bracket arm. The first horizontal upright of the first bracket arm has a horizontal slot 32 that is extended along the length of the first horizontal upright. Preferably the horizontal slot is centrally positioned therein. The first horizontal upright is flush at least one edge of the first arm to create a shelf like structure 34 along the top portion of the first bracket arm has its open face in a rearward direction, as seen in FIG. 3.

Figure 2:
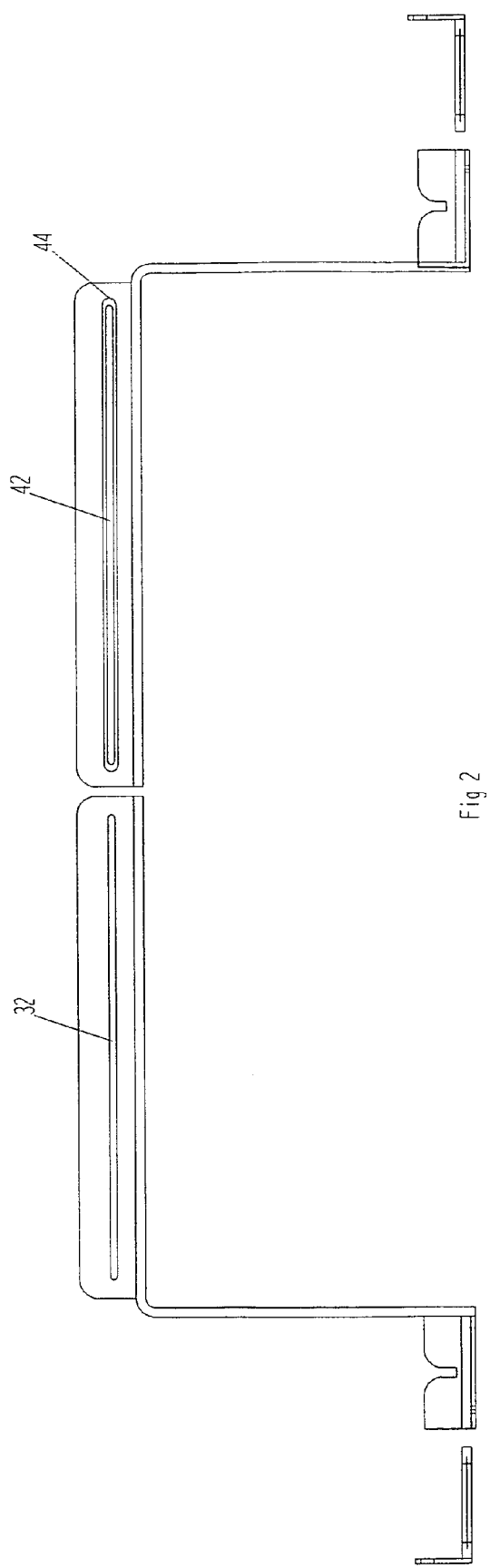
FIG. 2 is a semi-exploded view of the components of the bracket of FIG. 1.

The second bracket arm 28 has a second horizontal upright 40 that is perpendicular thereto and extends from the end second bracket arm to the vertical leg. Basically the second horizontal upright extends the entire length of the second bracket arm. The second horizontal upright of the second bracket arm has a horizontal slot 42 that is extended along the length of the second horizontal upright. Preferably the horizontal slot is centrally positioned therein. The horizontal slot of the second horizontal upright has a flared depression 44 around the rim thereof, as shown in FIG. 2. The second horizontal upright is flush at least one edge of the second arm to create a shelf like structure 46 along the top portion of the second bracket arm. As depicted in FIG. 3, The self like structure of the second bracket arm its open face in a frontward direction.

Figure 4:
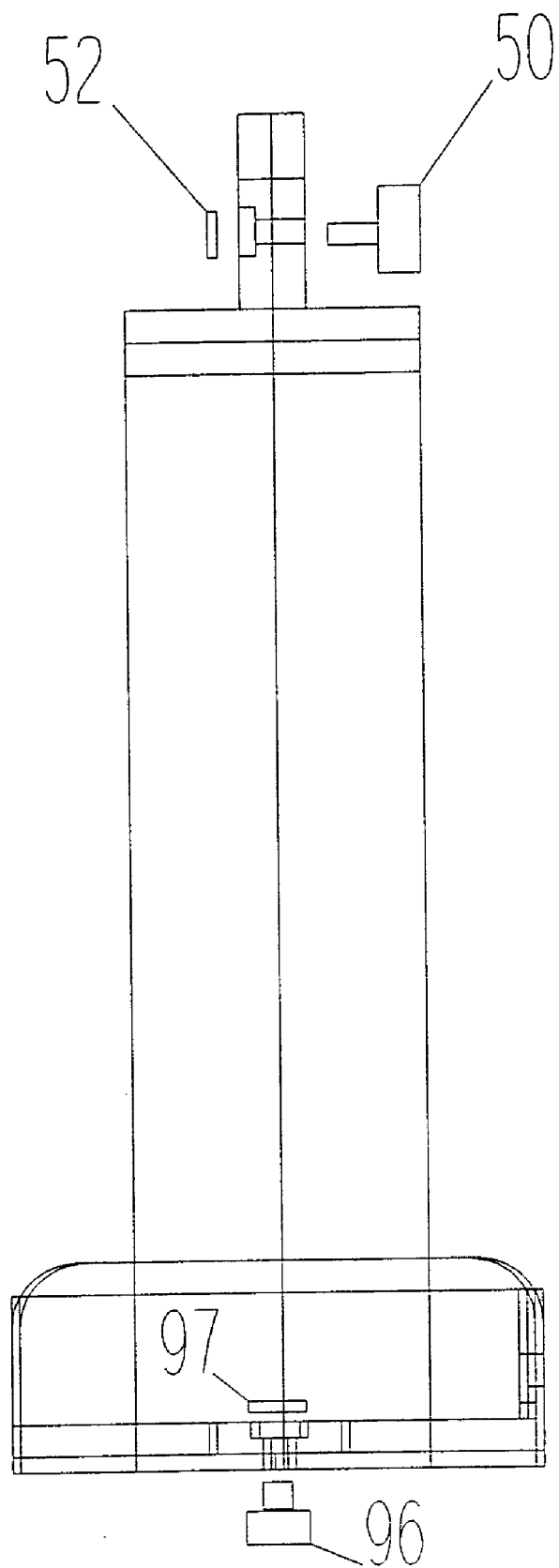
FIG. 4 is a side view of the speaker support bracket.
Figure 5:
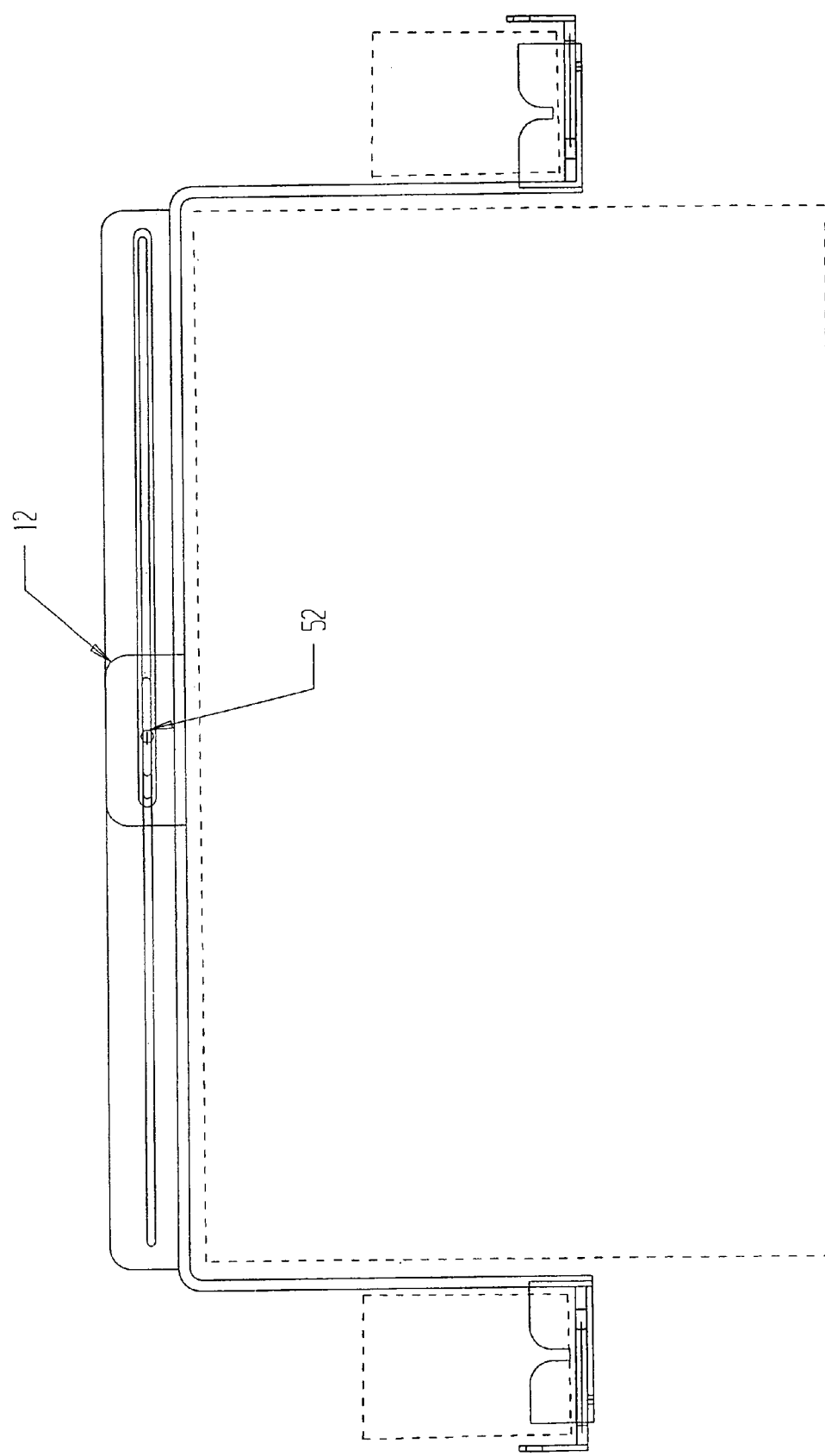
FIG. 5 is a front view of the present invention in an operable orientation.
Figure 6:
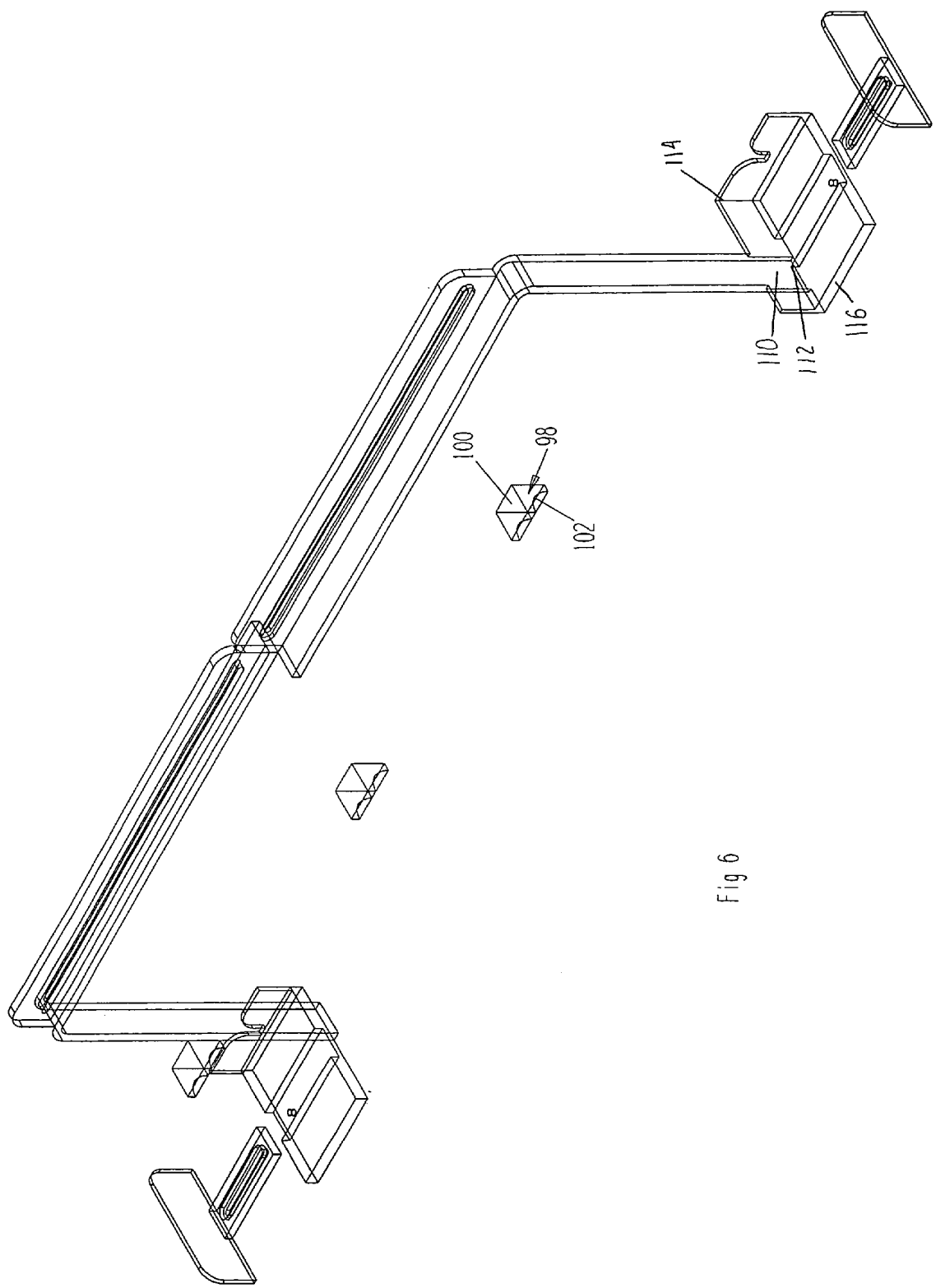
FIG. 6 is an isometric view of the apparatus of the present invention with flat screen fasteners.

The first bracket arm and the second bracket arm are coupled together with a screw 50 and nut 52 that is passed through the horizontal slot of the first horizontal upright and the horizontal slot of the second horizontal upright, as seen in FIG. 4. When the first and second bracket are fastened together, the rear face of the both uprights are positioned in side by side manner.

It is to be understood that the dimensions of the first and second bracket arm are interchangeable.

The speaker platforms of the first and second bracket arms are mirror images of each other. Each speaker platform is a unitary structure that has a back plate 58, an inside plate 60 and a generally flat support surface 62. The inside plate is integral a lower portion 110 of the respective vertical leg and the interior side of the support surface, as seen in FIGS. 1, 2, 3, 5 and 6 to create a common edge 112. The back plate is integral one side of the inside plate forming a common edge 114 as shown in FIGS. 1, 2, 3, 5 and 6. Each speaker platform has a horizontal passage or track 64 that is imbedded within the support surface, as depicted in FIG. 1. The support surfaces has as a front edge 116 that is spaced from the back plate and integral the common edge of the inside plate. The back plate of each speaker platform has a vertical slit 66 spaced from the common edge of the support surface and the back plate, as shown in FIG. 1. The slit allows the speaker wire to pass there through.

Each of the speaker platforms has a platform adjuster 68,70 with an adjustment arm 72,76 and an exterior plate 74,78. The exterior plate is integral the adjustment arm and extends away from the adjustment arm along a perpendicular plan, as seen in FIG. 1. The adjustment arm is sized to be seated within the horizontal passage 64. Each of the passages has a hole 82 spaced from the inside plate 60 and passing through the top surface 90 of the passage 64.

Each of the adjustment arms has a slot 92 with a flared depression/counter bore 94 that passes over the hole, as shown in FIG. 3. Each of the adjustment arms are capable of extensible movement within the horizontal passage or track to allow the support surface to be increased and decreased. A screw 96 is used to lock the adjustment arm in position once the desired width of the support surface is achieved. A nut 97 secures the screw to prevent movement of the adjustment arm.

Lastly, a plurality of wedges 98 are provided. The interior side 100 and exterior side 102 of each of the wedges has an adhesive surface. The wedges are used with flat screen monitors. The adhesive allows the wedges to be fastened to the top surface of the monitor and the underside of the mounting bracket. The wedges are generally "L" shaped and have an interior side and an exterior side. The interior side is sized and shaped to be positioned on the upper edge of a flat screen monitor. The exterior side has a flat upper portion that allows the underside of the adjustable mounting bracket to be seated securely thereon.

When in operation, the user will first couple the first bracket arm to the second bracket arm with a screw and nut. Then the bracket is positioned about a monitor and the final width adjustment of the apparatus is made and the nut is tightened about the screw. Preferably the brackets will be position around a box like computer monitor or a flat screen computer monitor. Once the bracket is secured around the monitor, the widths of the speaker platforms are adjusted to accommodate the dimensions of the speakers. With the platform width adjusted, the fastening screw and nut are tightened. The speakers are then seated within the respective platform.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, equitably entitled.

What is claimed is as follows:

1. A bracket for supporting speakers about a monitor comprising, in combination:
   an adjustable mounting bracket, the adjustable mounting bracket has a first bracket arm and a second bracket arm, the first bracket arm being integral to the vertical leg of the left speaker platform, and the second bracket arm being integral to the vertical leg of the right speaker platform;
   a right speaker platform and a left speaker platform, the right and left speaker platforms each being integral a vertical leg that is integral to the adjustable mounting bracket, the right speaker platform and the left speaker platform each having an inside plate integral a lower portion of the respective vertical leg, the right speaker platform and the left speaker platform each having a back plate integral one side of the inside plate, the right speaker platform and the left speaker platform each having a support surface integral the inside plate and the back plate to form common edges, each of the vertical legs are spaced apart and parallel a respective side of a monitor;
   a right adjustment arm capable of fastening onto the support surface of the right speaker platform and a left adjustment arm capable of fastening onto the support surface of the left speaker platform;
   the first bracket arm has a first horizontal upright that is perpendicular thereto and extends from an end of the first bracket arm to the vertical leg of the left speaker platform, and the second bracket arm has a second horizontal upright that is perpendicular thereto and extends from a end of the second bracket arm to the vertical leg of the right speaker platform the length of the second bracket arm, and
   wherein when the adjustable mounting bracket is positioned juxtapose the top of the monitor, the right and left speaker platforms will each support a speaker next to a right side and left side of the monitor and above a support surface of the monitor.

2. The bracket for supporting speakers about a monitor as set forth in claim 1, wherein the first horizontal upright has a horizontal slot that extends the length of the first horizontal upright, and the second horizontal upright has a horizontal slot that extends the length of the second horizontal upright.

3. The bracket for supporting speakers about a monitor as set forth in claim 2, wherein a screw is passed through the first horizontal slot and the second horizontal slot to fasten the first bracket arm and the second bracket arm in an adjustable relationship when the mounting bracket is positioned on the top of the monitor.

4. The bracket for supporting speakers about a monitor as set forth in claim 1, wherein the back plate for the right speaker platform and the left speaker platform has a vertical slit spaced from the common edge of the support surface.

5. The bracket for supporting speakers about a monitor as set forth in claim 4, including a right platform adjuster and a left platform adjuster, the right platform adjuster is formed by the right adjustment arm integral a right exterior plate, and the left platform adjuster is formed by the left adjustment arm integral a left exterior plate, the right and left exterior plate extends away from the respective adjustment arm.

6. The bracket for supporting speakers about a monitor as set forth in claim 5, wherein the right adjustment arm is sized to be seated in a horizontal passage imbedded within the support surface of the right speaker platform, and the left adjustment arm is sized to be seated a horizontal passage imbedded within the support surface of the left speaker platform, the right and left adjustment arms each are capable of extensible movement within the respective horizontal passage to decrease or increase a width of the respective support surface.

7. The bracket for supporting speakers about a monitor as set forth in claim 1, wherein the mounting bracket has an underside.

8. The bracket for supporting speakers about a monitor as set forth in claim 7, including a plurality of wedges, with the plurality of wedges are capable of being fastened to the underside of the mounting bracket and a top surface of the monitor for securing the mounting bracket onto the monitor.

9. The bracket for supporting speakers about a monitor as set forth in claim 8, wherein the monitor is a computer monitor.

* * * * *